United States Patent Office 3,704,108
Patented Nov. 28, 1972

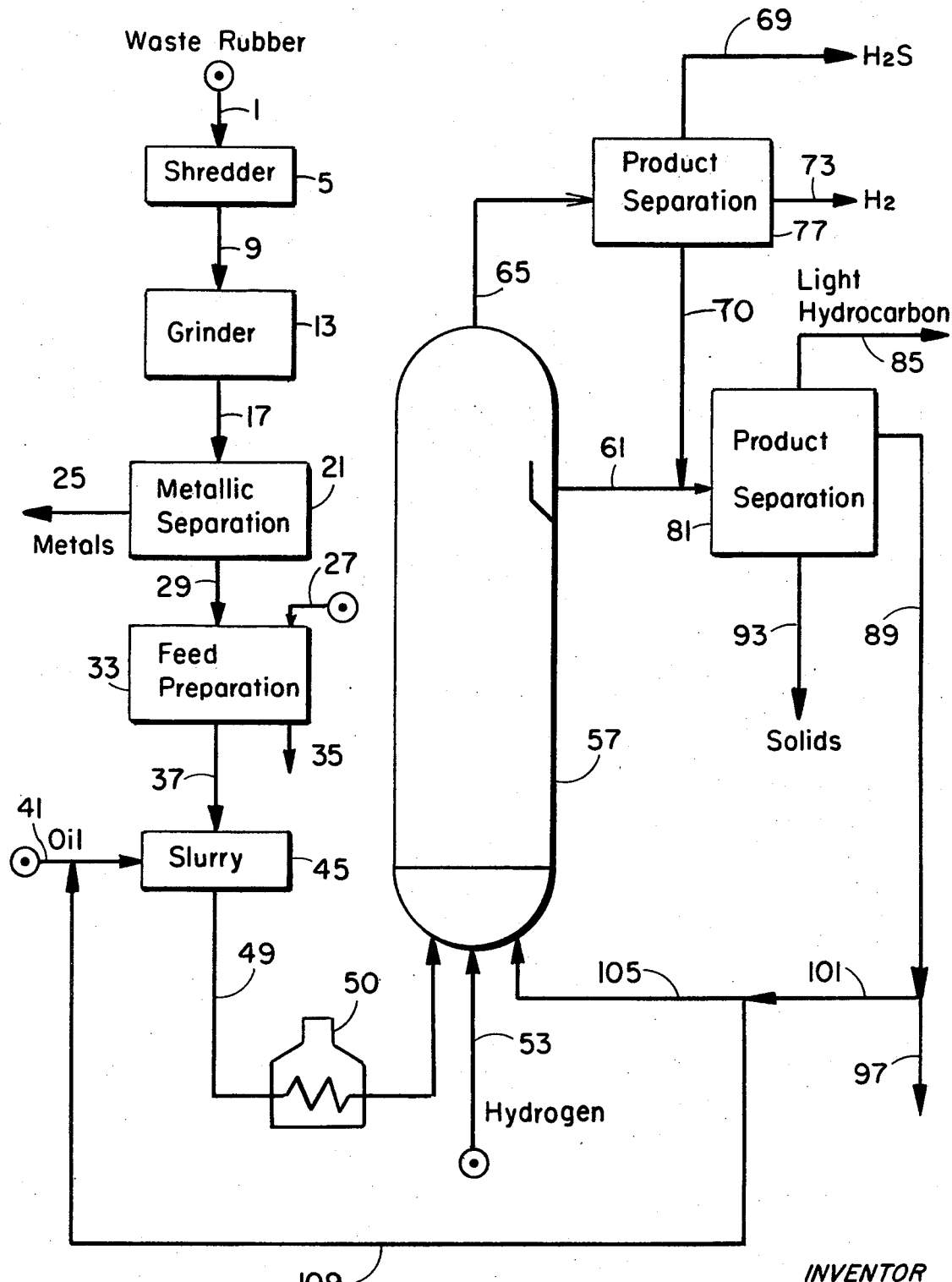

3,704,108
HYDROCONVERSION OF WASTE NATURAL AND SYNTHETIC RUBBERS
Seymour B. Alpert, Princeton, N.J., assignor to Hydrocarbon Research, Inc., New York, N.Y.
Filed Sept. 25, 1970, Ser. No. 75,592
Int. Cl. C10l 1/16
U.S. Cl. 44—62
25 Claims

ABSTRACT OF THE DISCLOSURE

Waste natural and synthetic rubbers are converted in the presence of a catalyst and in a hydrogen environment by passing a particulate rubber slurry and hydrogen upwardly through a reactor maintained under temperatures in the 700 to 850° F. range and pressures in the 500 to 3000 p.s.i.g. range. The particulate rubber is converted in the reactor to hydrocarbon liquids while unconvertible solids originally compounded with the rubber leave unchanged in the product. The hydrocarbon stream can have a wide range of properties depending on the objectives of the user of the process.

BACKGROUND

Over the past one hundred years the importance of rubber to an industrialized society has increased. At first man had only natural rubber at his disposal. In recent times, especially since the end of the Second World War, synthetic rubbers produced from petrochemical sources have become more important than natural rubber.

In 1844, Charles Goodyear was granted a patent on the addition of sulfur to natural rubber to create vulcanized rubber. Sulfur, added to rubber, cross-links the polymer structure to harden synthetic or natural rubber. In oder to increase the wear characteristics for such uses as tires substantial amounts of carbon black are compounded into the rubber. Other materials used as compounders in rubber are organic accelerators, extender oils, antioxidants, and inorganic compounders such as zinc oxide, clay fillers and pigments. Table I shows typical ranges for materials that are compounded with rubber.

TABLE I

| | Parts |
|---|---|
| Rubber | 100 |
| Sulfur | 0.5 to 50.0 |
| Accelerator | 0.3 to 3.0 |
| Zinc oxide | 2.0 to 10.0 |
| Stearic acid | 0 to 4.0 |
| Antioxidant | 0 to 3.0 |
| Softener | 2 to 50.0 |
| Pigment-carbon black | 20 to 300 |

The most important use of natural and synthetic rubber is for tires. Tire production consumes about 65 percent of elastomer production in the United States. In 1969, about 3.8 billion pounds of elastomers were consumed for tires and related products while the additives such as carbon black, tire cord, zinc oxide, oil extenders, etc. represent an additional 3 to 4 billion pounds of raw materials per year that were compounded with the rubber. In the United States there is a total yearly utilization of about 10 billion pounds of raw materials for rubber products. After the consumer has used the rubber product, it is discarded. No economical means by which to dispose of rubber waste has been developed. Waste tires not only are unsightly, but become a health hazard when they are abandoned to become a breeding ground for rats and insects. Waste tires are also leached by surface water which reults in contaminated streams.

Waste rubber is not conveniently burned in incinerators. The sulfur is released when tires are burned, and the sulfur oxides add to air pollution. If rubber waste is disposed of in municipal incinerators it first melts, then sticks to the grate and the resultant high temperatures at the grate can damage the incinerator. Cities have passed legislation preventing open burning of used rubber tires which has resulted in tires accumulating in storage sites. Waste rubber is not suitable as land fill material because it is resistant to biodegradation and it tends to work itself back to the surface of the land when buried.

The U.S. Bureau of Mines (Report of Inventigation 7302, dated September 1969) recognized the need to convert waste rubber to gas, liquids and solids using a carbonization technique. The Bureau of Mines work was carried out batchwise at temperatures of 500° C. to 900° C. and used holding times of about 8 hours to thermally carbonize waste rubber tires. The thermal process has many disadvantages.

SUMMARY

It has been discovered that natural and synthetic waste rubber can be conveniently disposed by the hydroconverssion of the rubber to liquid and gaseous hydrocarbons essentially free of compounders. The organic compounders are converted in the reactor whereas inert compounders such as carbon black, zinc oxide, etc., are passed through the system unchanged and can be recovered and reused.

Hereinafter the word rubber shall be understood to mean natural and synthetic rubbers such as exemplified by plantation rubber, thiokols, neoprenes, nitrile rubbers, styrene rubbers, butyl rubbers, polybutadiene, silicone rubbers, acrylate rubbers, polyurethanes, fluoro rubbers, etc.

A continuous disposal of rubber is achieved by feeding particulate rubber in a slurry with a compatible hydrocarbon upwardly through a catalytic reaction zone together with a hydrogen containing gas at a rate sufficient to maintain the particulate matter in random motion in the liquid in the reaction zone. The rubber may be suitably pretreated for removal of metals and fibers and reduced in size. Such means as magnetic separation, shaking tables, caustic wash and other means known in the art are suitable pretreatments. Size reduction is by conventional shredding and grinding. The velocity in the reaction zone is sufficient to carry out of the system any unconverted inorganic compounders of small particle size while the rubber particles are converted to lower molecular weight liquid hydrocarbons.

The liquid effluent can then undergo subsequent treatment for separation of the hydrocarbon product fractions and unconverted compounders.

In the operation of this invention it has been discovered that, by proper control of the process and subsequent product upgrading, a range of products is obtainable dependent upon the objectives of the operation of the process. The process can produce (a) heavy asphalt-like materials and solids; (b) a low sulfur fuel oil and solids; (c) a low sulfur fuel, aromatic naphtha and solids; (d) aromatic chemicals and solids; and (e) gas and aromatic chemicals and solids. This choice of range of products gives heretofore unavailable flexibility in the disposal of waste rubber. The low sulfur fuel oil can be further upgraded.

It is discovered in this invention that the sulfur content in the hydrocarbon product is about 0.1 percent reflecting the ability of this process to hydrodesulfurize the polymers that are cross-linked by sulfur which was added in the vulcanization step.

The compounders in the waste rubber go through the reactor system essentially unchanged rather than being degraded which is the result when thermal techniques are used. These compounders can be recovered and reused by the process of this invention. The rubber which binds the components together in a loose chemically bound matrix is liquefied to hydrocarbons. If the compounders are not separated from the liquid hydrocarbons, the slurry of finely divided carbon and liquids could be used for fuel, after distilling off the naphtha. By separating the solids and liquids, the solids product obtained is suitable for insulation or filler material, or can be recompounded with fresh rubber for use in the manufacture of new rubber products.

An object of this invention is to consume rubber but preferably waste rubber without adding to the pollution of the environment.

Another object of this invention is to continuously hydroconvert rubber to liquid hydrocarbons.

A further object of this invention is to obtain a low sulfur containing liquid hydrocarbon product from rubber.

Yet another object of this invention is to recover, without degrading, solid inorganic compounders present in rubber preferably as waste rubber.

Further objects of this invention will become apparent from the following detailed description of a preferred form of embodiment thereof.

DESCRIPTION OF THE DRAWING

The figure is a schematic illustration of the process for the hydroconversion of rubber to liquid and gaseous hydrocarbon products and for the recovery of the solids in the product.

DESCRIPTION OF PREFERRED EMBODIMENT

This invention discloses a new hydrogenation process using an ebullated bed, the techniques of which were first described in U.S. Pat. No. Re. 25,770, for the hydroconversion of rubber into valuable products. This invention preferably represents a unique discovery which results in a process for continuously converting waste rubber to useful products with high yields and features a wide range in flexibility with respect to the characteristics of the hydrocarbon product and the solids product recovered.

According to a preferred embodiment of the process of the present invention, waste rubber is continuously fed in line 1 to shredder 5 and then passes in line 9 to grinding zone 13. The rubber is ground to a size preferably in the range of about 1/8 inch to 100 mesh USS. The particulate rubber then passes in line 17 to metals separation zone 21 and the metals leave in line 25. This zone 21 can be a magnetic separation device, a shaking table and the like. The essentially metals-free particulate rubber passes in line 29 to feed preparation zone 33. In this zone 33 a caustic solution in 27 can be used to remove any fiberous materials with the spent caustic leaving in line 35 or alternatively the fibers may be left in the particulate rubber. The particulate rubber leaves zone 33 in line 37 for slurrying in zone 45 with a suitable hydrocarbon oil such as aromatic decant oils, catalytic heavy gas oil, virgin heavy gas oil fed to 45 in line 41. The rubber slurry then passes in 49 to enter, by upflow, ebullated reaction zone 57. The rubber slurry, in passing through 49, is heated to 500 to 800° F. in heater 50. A hydrogen-containing gas is fed to reaction zone 57 in line 53. The gas contains preferably greater than 60 percent hydrogen.

The slurry enters the reaction zone at a space velocity of between about 10 and about 400 lbs./hr./ft.³ reactor and at a temperature between about 700 and about 850° F. The hydrogen enters the reaction zone at a temperature between about 700 and about 1000° F. at a rate of about 10,000 to 50,000 standard cubic feet (s.c.f.) of hydrogen per ton of waste rubber.

The reaction zone 57 contains a catalyst suitable for desulfurization and hydroconversion such as nickel molybdate on alumina, cobalt molybdate or silica-alumina or cobalt molybdate on alumina. The reaction zone 57 is operated at a pressure between 500 and 3000 p.s.i.g.

It is to be understood that reaction zone 57, although described as a single stage, can be a series of two or more stages.

A recycle stream in line 105 can be fed to the reaction zone to provide additional velocity for the reactants in the reactor.

The total space velocity of the solid waste rubber entering the reaction zone is between 10 and 400 pounds/hr./cubic foot of reactor space. The reactor velocity is sufficient to maintain the catalyst and particulate rubber in random motion in the liquid with no carryover of catalyst but complete carryover of fine inorganic compounders. The velocity is sufficient to carry compounders out of the reaction zone 57 in the liquid effluent in line 61 because they are small in size relative to the size of the catalyst particles. The catalyst will have a size range between 100 USS mesh (149 microns) and 1/16 inch whereas the inert compounders will be smaller than 50 microns in diameter.

The gaseous effluent leaves reaction zone 57 in line 65. This effluent enters separator 77 and the $H_2S$ is removed in line 69 while the hydrogen is removed in line 73. The hydrogen in 73 can be recycled to supplement the hydrogen feed in line 53 or the entire stream in 65 can be sent to a refinery for recovery. Light hydrocarbons in 70 can be combined with 61 or can pass out of the system in combination with 85.

The liquid effluent leaves reaction zone 57 in line 61 carrying with it any fine small size compounders. Line 61 enters separation zone 81 wherein a light hydrocarbon stream is removed in line 85 and a heavier hydrocarbon stream is removed in line 89. Solids leaves 81 in line 93 and are suitable for recovery and reuse for compounding rubber, water treatment, pigments, filler and insulation or for burning as a solid carbonaceous material.

A liquid hydrocarbon product is removed from line 89 in line 97. This product is suitable for use as a low sulfur fuel oil with a sulfur content of less than 0.1 percent or it may be further upgraded in a subsequent separate catalytic operation.

A recycle of liquid hydrocarbons is taken from line 89 in line 101 and passes as direct recycle to reaction zone 57 in line 105 or part can be passed in line 109 to serve as slurry oil in zone 45.

When the reaction zone 57 is operated to produce low sulfur liquid and solids the preferred conditions are at a pressure of about 1000 p.s.i.g., a space velocity of 30 to 200 pounds of rubber/hr./cubic foot of reactor, and a temperature in the range of 750° F. to 850° F. Hydrogen circulation rates of 20,000 to 40,000 cubic feet per ton are preferred.

This waste rubber process may also be integrated with an existing operating refinery. The process takes in a rubber suitably reduced in size by shredding and grinding operations to permit slurrying and pumping the waste rubber up to the pressure of the system. Extraneous foreign metals such as nails, and bits of glass are removed by conventional techniques familiar to rubber reclaiming operators. The ground and prepared waste rubber is then slurried with a solids-free oil. The oil stream is either generated from the hydroconversion of the waste rubber or is supplied by the refinery. The slurry of waste rubber and oil is then mixed with hydrogen. The hydrogen gas is obtained from a hydrogen generation source inside the refinery. The source may be any hydrogen production technique such as natural gas reforming, hydrogen from catalytic reforming, or partial oxidation hydrogen generating processes conventionally used in hydrogen manufacture.

If desired a gas oil, preferably boiling above 600° F., is made available as a slurrying oil from the refinery to carry the waste rubber into the reaction system. The ground rubber is reacted, and the products sent to the refinery for recovery. In the refinery, the liquid and gas products are recovered, and the inoragnic constituents such as carbon black, zinc oxide, pigments, etc., are separated. These latter compounders are reusable.

Having thus described a preferred embodiment of this invention and the integration of this process with a refinery, reference is now had to specific examples which have been carried out in accordance with the process of the present invention.

EXAMPLE I

For purposes of this example, the inspections on the raw feed are shown in Table II. The feed is butadiene styrene waste rubber tires which are ground to a 30 U.S. mesh particulate size and not treated for removal of the tire cord.

TABLE II

Inspections on rubber

Source: used tires.
Proximate analysis in weight percent:
    Water _____ 0.8
    Volatile matter _____ 64.2
    Ash _____ 3.8
    Fixed carbon _____ 31.2
                                            _____
                                            100.0
Elemental analysis in weight percent:
    Carbon _____ 85.50
    Hydrogen _____ 7.54
    Sulfur _____ 1.73
    Ash _____ 3.74
    Nitrogen _____ 0.32
    Oxygen _____ 0.37
    Water _____ 0.80
                                            _____
                                            100.00

The 30 mesh waste ruber feed is slurried with a 10° A.P.I., 1 percent sulfur, heavy gas oil boiling between 650 and 1000° F. and is then pumped to the single stage ebullated bed reaction zone. Table III shows the results of hydrotreating, desulfurizing and hydroconverting, the feed from Table II in the single stage ebullated bed reaction zone.

The yields shown are based on the rubber feed and excludes the slurry oil. As indicated, low sulfur liquids are obtained, along with carbon black and inert compounders which are recovered.

TABLE III

Processing of waste rubber

Unit—Single Stage

Operating conditions:
    Hydrogen pressure, p.s.i. _____ 1000
    Temperature, ° F. _____ 850
    Space velocity, lbs. feed/hr./ft.$^3$ of reactor __ 75.0
    Catalyst type _____ (1)
    Catalyst diameter, inches _____ 0.03
    Hydrogen rate, s.c.f./ton rubber _____ 15,000
    diluent type—Decane oil _____ (2)
    Velocity, g.p.m./ft.$^2$ _____ 50
    Decant oil, percent _____ 0.50
    Waste rubber, percent _____ 0.50
Net yields, based on waste rubber feed (wt. percent):
    $H_2S$ _____ 1.8
    $CH_4$ _____ 2.7
    $C_2H_6$ _____ 2.8
    $C_3H_8$ _____ 3.1
    $C_4$–400° F. _____ 9.0
    400° F. plus _____ 52.1
    Carbon black and inert compounders _____ { 30.0
                                                101.5
    Hydrogen consumption, s.c.f./ton _____ 5,700
    Sulfur in 400° F.+ liquid, percent _____ 0.1

[1] Extruded cobalt molybdate on alumina.
[2] 10° API, 1% sulfur, 650–1000° F. boiling range.

EXAMPLE 2

The fine carbon black and inert compounders that pass through the ebullated bed rapidly settle in the product as shown in Example 1. The solids are recovered by settling, and filtering the low viscosity light oil product. The carbon black and inert compounders are washed to remove oil that adheres to the solids. The solids have the properties set forth in Table IV.

TABLE IV

Inspection:
    Percent of solids based on waste rubber feed __ 30.0
    Size—microns _____ 3
    Percent volatile matter _____ 2
    Weight percent carbon _____ 85
    Weight percent ash _____ 15
    Percent acetone extractibles _____ 0.1

Inspection on ash-percent:
    Silicon oxide _____ 70
    Zinc oxide _____ 20
    Aluminum oxide _____ 7
    Other _____ 3
    Surface area—m.$^2$/gm. _____ 100

EXAMPLE 3

The carbon black solids recovered in Example 2 are combined with styrene-butadiene rubber to test its suitability for reuse with fresh rubber. Table V compares properties of rubber made with fresh carbon black to those same properties of rubber made with the carbon black solids recovered in this process. As can be seen in Table V, the recovered carbon black solids compare favorably with the commercial carbon black for compounding rubber. The recovery of carbon black solids is an economically attractive step in the hydroconversion of waste rubber tires as reinforcing carbon black has a present value of 4 to 6 cents per pound while left in waste rubber tires the carbon black solids have no intrinsic value and actually are costly to dispose of.

TABLE V

| Carbon black source | Commercial fresh carbon black (SRF-HS) | Recovered carbon black |
|---|---|---|
| Test No | ASTM D-15 | ASTM D-15 |
| Tensile strength, p.s.i | 3,380 | 3,380 |
| Elongation, percent | 500 | 510 |
| Modulus, p.s.i.: | | |
| 200 percent elongation | 980 | 805 |
| 300 percent elongation | 1,660 | 1,415 |

EXAMPLE 4

Similar rubbers are treated by the thermal process using prior art methods and by the process of this invention. It is to be noted from Table VI that the thermal process produces greater amounts of residue, and the thermal process produces lesser amounts of liquid hydrocarbons than the process of this invention.

TABLE VI

| Process | Thermal | | Ebullated bed hydro conversion |
|---|---|---|---|
| | Low severity | High severity | |
| Yields, percent on feed: | | | |
| Gas | 3.4 | 21.4 | 8.6 |
| Residue (char) | 46.7 | 53.7 | 30.0 |
| Light and heavy oil | 49.5 | 21.1 | 61.1 |
| Liquor, NH₃ | 0.4 | 3.8 | |
| H₂S | | | 1.8 |
| Total | 100 | 100 | 101.5 |
| Feed, percent: | | | |
| Moisture | 0.5 | 0.5 | 0.8 |
| Volatile matter | 62.3 | 62.3 | 64.2 |
| Fixed carbon | 31.5 | 31.5 | 31.2 |
| Ash | 5.7 | 5.7 | 3.8 |
| Source of rubber | Tires | | Tires |

EXAMPLE 5

The liquid hydrocarbon product fraction from Example 1 is hydrocracked in a subsequent ebullated bed reaction zone as follows:

Liquid product from the hydroconversion of waste rubber

Feed:
  Gravity °API _____ 10
  Sulfur, weight percent _____ 0.1

Operating conditions:
  Hydrogen pressure, p.s.i.g. _____ 2000
  Space velocity, $V_f$/hr./$V_r$ _____ 0.4
  Hydrogen rate, s.c.f./bbl. _____ 6000
  Temperature, °F. _____ 800
  Catalyst type _____ (a)
  Catalyst diameter, inches _____ 0.03
  Velocity, gal./min./ft.² _____ 50
  650° F. plus recycle ratio, vol. recycle/vol. feed _____ 1

Yield, percent on feed:
  H₂S, NH₃, weight percent _____ 0.1
  C₁–C₃, weight percent _____ 3.0
  C₄, 400° F., volume percent _____ b 75.0
  400–650° F., volume percent _____ c 40.0 a Cobalt molybdate on silica alumina.
b 65° API gravity.
c 45° API gravity.

The naphtha made is of suitable quality to represent a potential gasoline component in that the aromatics and naphthene content is 60 percent of the naphtha. In this way, wase rubber could be coverted to light distillate products suitable for inclusion with refinery products.

EXAMPLE 6

The process of this invention is applied to butyl rubber as derived from grinding inner tubes. In the operation of the process a 650 to 1,000° F. product fraction is used to slurry the 30 mesh particles of butyl rubber. Table VII summarizes inspections in the butyl rubber feed.

TABLE VII

Inspections on butyl rubber feed

| Chemical analysis: | Percent |
|---|---|
| Carbon | 80.4 |
| Hydrogen | 12.5 |
| Sulfur | 1.3 |
| Moisture | 2.5 |
| Ash | 2.5 |
| Oxygen | 0.8 |
| Total | 100.0 |

| Proximate analysis: | Percent |
|---|---|
| Volatile matter | 89.0 |
| Fixed carbon | 6.0 |
| Ash | 2.5 |
| Moisture | 2.5 |

At the conditions indicated in Table VIII the butyl rubber is reacted in the presence of a silica alumina based catalyst which is impregnated with cobalt molybdate. At these conditions the rubber is liquefied to form an oil having a high gravity in the API scale, and practically all the sulfur is converted to hydrogen sulfide. Hydrogen consumption is relatively low and corresponded to 3000 standard cubic feet per ton of rubber. The relatively low hydrogen consumption reflects the unsaturated nature of butyl rubber which is derived mostly from isobutylene monomer with small amounts of isoprene monomer providing unsaturated bonds in the polymer. The inert carbon black and inorganic compounders are completely recovered and could be reused if desired after separation and drying.

TABLE VIII

Size of butyl rubber: 30 mesh
Catalyst: Cobalt molybdate on silica alumina base
Operating conditions:
  Hydrogen pressure, p.s.i.g.: 800
  Temperature, °F.: 760
  Space velocity, lbs./hr./ft.³ reactor: 50
  Hydrogen rate, s.c.f./ton: 20,000
  Recycle oil: 650–1000° F. product
  Recycle oil rate, lb./lb. feed: 2.0
  Velocity in reactor, g.p.m./ft.²: 60
  Catalyst size, inches: 1/32 extrudates

| Yields, percent on butyl rubber | W, percent | °API | Percent sulfur |
|---|---|---|---|
| H₂S | 1.4 | | |
| CH₄ | 0.4 | | |
| C₂H₆ | 0.6 | | |
| C₃H₈ | 5.7 | | |
| Liquids | 84.1 | 45 | 0.1 |
| Solids | 8.6 | | |
| Total | 100.8 | | |
| Hydrogen consumption, s.c.f./ton | 3,000 | | |

As can be determined from the hereinabove description of this invention and the examples thereof many modifications and alternations of the above single or multistaged invention will become apparent to those skilled in the art, however, the scope of this invention should not be unduly restricted thereby and is limited only by the claims appended hereto.

I claim:

1. The process for the hydrogenation of rubber under superatmospheric temperatures and pressures comprising:
   (a) slurrying the rubber with a liquid hydrocarbon;
   (b) feeding the slurry to a reaction zone;
   (c) feeding a hydrogen containing gas to said reaction zone;
   (d) passing said slurry through said reaction zone;
   (e) maintaining the solids in random motion in the liquid in said reaction zone;
   (f) operating said reaction zone at a temperature between about 700° F. and 850° F.; and
   (g) withdrawing an effluent with a liquid hydrocarbon component and solids component.

2. The process for the hydrogenation of rubber under superatmospheric temperatures and pressures comprising passing a hydrogen rich gas through a subdivided mass of rubber and recovering therefrom an effluent with a liquid hydrocarbon component and solids component which comprises:
(a) slurrying the rubber with a liquid hydrocarbon;
(b) feeding the slurry and a particulate catalyst to a reaction zone;
(c) feeding a hydrogen containing gas to said reaction zone;
(d) passing said slurry through said reaction zone in upflow;
(e) maintaining the solids in random motion in the liquid in said reaction zone;
(f) operating said reaction zone at a temperature between about 700° F. and 850° F.; and
(g) withdrawing the effluent with a liquid hydrocarbon component and solids component.

3. The process of claim 2 wherein the rubber is ground to between 1/8 of an inch and 100 mesh USS size particles prior to the slurry step.

4. The process of claim 2 including the step of removing metals from the rubber prior to the slurry step.

5. The process of claim 4 including the step of removing fibers from the rubber prior to the slurry step.

6. The process of claim 2 wherein the particulate rubber slurry is heated to between 500 and 800° F. prior to feeding said slurry to the reaction zone.

7. The process of claim 2 wherein the reaction zone is maintained under a pressure of between 500 and 3,000 pounds per square inch.

8. The process of claim 2 wherein the space velocity in the reaction zone is about 30 to 200 lbs. of rubber per hour per cubic foot of reaction zone.

9. The process of claim 2 wherein the liquid hydrocarbon for slurrying the particulate rubber, and the hydrogen containing gas are obtained from a petroleum refinery.

10. The process of claim 2 wherein the catalyst is cobalt molybdate on alumina.

11. The process of claim 2 which comprises:
(g) passing the effluent from step (f) to a second catalyst containing reaction zone;
(h) feeding a hydrogen rich gas to said second zone;
(i) maintaining the solids in random motion in the liquid;
(j) operating said second zone under conditions of temperature and pressure within the ranges of the first zone;
(k) withdrawing an effluent from said second zone.

12. A process for hydroconverting rubber from tires which comprises:
(a) grinding the rubber tires to a particle size between about 1/8 inch and 100 mesh USS;
(b) separating metals from the particulate rubber;
(c) slurrying said particulate rubber with a liquid hydrocarbon;
(d) heating the slurry to a temperature between 500 and 800° F.;
(e) feeding said slurry in upflow through a particulate catalyst containing reaction zone;
(f) passing a hydrogen containing gas to said reaction zone;
(g) maintaining the solids in random motion in the liquid in the reaction zone;
(h) operating said reaction zone at a temperature between 700 and 850° F. and at a pressure between 500 and 3,000 p.s.i.g.; and
(i) withdrawing gaseous, liquid and solid products from said reaction zone.

13. A process for recovering solid compounders from rubber which comprises:
(a) grinding the rubber;
(b) slurrying the particulate rubber with a liquid hydrocarbon;
(c) feeding the slurry in upflow through a particulate catalyst containing reaction zone;
(d) passing a hydrogen containing gas to said reaction zone;
(e) maintaining the solids in random motion in the liquid in the reaction zone;
(f) withdrawing gaseous, liquid and solid products from the reaction zone; and
(g) recovering the solid compounders from the liquid product.

14. A process for the desulfurization of vulcanized rubber which comprises:
(a) slurrying a particulate rubber with a liquid hydrocarbon;
(b) heating the slurry to a temperature between 500 and 800° F.;
(c) feeding said slurry in upflow through a particulate catalyst containing reaction zone;
(d) passing a hydrogen containing gas to said reaction zone;
(e) maintaining the solids in random motion in the liquid in the reaction zone;
(f) operating said reaction zone at a temperature between 700 and 850° F. and at a pressure between 500 and 3,000 p.s.i.g.;
(g) withdrawing gaseous and liquid products from said reaction zone; and
(h) recovering a liquid product with less than 0.1 weight percent sulfur.

15. A process for the production of useful rubber compounders from a source of waste rubber which comprises:
(a) grinding the rubber;
(b) slurrying the particulate rubber with a liquid hydrocarbon;
(c) feeding the slurry in upflow through a particulate catalyst containing reaction zone;
(d) passing a hydrogen containing gas to said reaction zone;
(e) maintaining the solids in random motion in the liquid in the reaction zone;
(f) withdrawing gaseous, liquid and solid products from the reaction zone; and
(g) recovering the solid compounders from the liquid product.

16. The process of claim 1 wherein the rubber is ground to between 1/8 of an inch and 100 mesh USS size particles and the metals and fibers are removed from the rubber prior to the slurry step and the slurry is heated to between 500 and 800° F. prior to feeding said slurry to the reaction zone and wherein the reaction zone is maintained at a temperature between 700 and 850° F. and under a pressure of between 500 and 3,000 pounds per square inch.

17. The process of claim 1 wherein the space velocity in the reaction zone is about 30 to 200 lbs. of rubber per hour per cubic foot of reaction zone.

18. A process for hydroconverting rubber from tires which comprises:
(a) grinding the rubber tires to a particle size between about 1/8 inch and 100 mesh USS;
(b) separating metals from the particulate rubber;
(c) slurrying said particulate rubber with a liquid hydrocarbon;
(d) heating the slurry to a temperature between 500 and 800° F.;
(e) feeding said slurry through a reaction zone;
(f) passing a hydrogen containing gas to said reaction zone;
(g) operating said reaction zone at a temperature between 700 and 850° F. and at a pressure between 500 and 3,000 p.s.i.g.; and
(h) withdrawing gaseous, liquid and solid products from said reaction zone.

19. A process for recovering solid compounders from rubber tires which comprises:
(a) grinding the rubber;
(b) slurrying the rubber with a liquid hydrocarbon;
(c) feeding the slurry through a reaction zone;

(d) passing a hydrogen containing gas to said reaction zone;
(e) withdrawing gaseous, liquid and solid products from the reaction zone; and
(f) recovering the solid compounders from the liquid product.

20. The process of claim 1 wherein the rubber is butadiene styrene rubber.

21. The process of claim 2 wherein the rubber is butadiene styrene rubber.

22. The process of claim 1 wherein the rubber is butyl rubber.

23. The process of claim 2 wherein the rubber is butyl rubber.

24. The process of claim 1 wherein the rubber is natural rubber.

25. The process of claim 2 wherein the rubber is natural rubber.

References Cited

UNITED STATES PATENTS 3,582,279   6/1971   Beckman et al. _____ 260—2.3 X

FOREIGN PATENTS 726,760   6/1932   France.

PATRICK P. GARVIN, Primary Examiner

W. J. SHINE, Assistant Examiner

U.S. Cl. X.R.

44—80; 23—209.2, 209.9; 201—25; 260—2.3, 94.7 H